(12) United States Patent
Lin et al.

(10) Patent No.: US 8,729,490 B2
(45) Date of Patent: May 20, 2014

(54) METHOD OF ENERGY SPECTRUM ANALYSIS FOR SODIUM IODIDE (NAI) DETECTOR

(75) Inventors: Kuo-Jen Lin, Taoyuan County (TW); Chung-Chih Lin, Taoyuan County (TW); Mao-Chen Liu, Taoyuan County (TW); Jinn-Yih Wu, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 418 days.

(21) Appl. No.: 13/192,685

(22) Filed: Jul. 28, 2011

(65) Prior Publication Data

US 2012/0271562 A1    Oct. 25, 2012

(30) Foreign Application Priority Data

Apr. 19, 2011 (TW) .............................. 100113471 A

(51) Int. Cl.
*G01J 1/42* (2006.01)
*G06F 19/00* (2011.01)

(52) U.S. Cl.
CPC .................................... *G06F 19/00* (2013.01)
USPC ......................................................... 250/395

(58) Field of Classification Search
USPC ........................ 250/303, 369, 395; 702/28, 30
See application file for complete search history.

(56) References Cited

U.S. PATENT DOCUMENTS

| 4,580,048 | A | * | 4/1986 | Dion .............................. 250/256 |
| 5,081,581 | A | * | 1/1992 | Koral et al. ...................... 378/87 |
| 8,084,748 | B2 | * | 12/2011 | Peng et al. ...................... 250/394 |
| 2008/0011962 | A1 | * | 1/2008 | Russ .............................. 250/395 |
| 2009/0127468 | A1 | * | 5/2009 | Fehrenbacher .......... 250/370.07 |
| 2009/0166542 | A1 | * | 7/2009 | Ruan et al. ...................... 250/369 |
| 2012/0271562 | A1 | * | 10/2012 | Lin et al. ......................... 702/28 |

* cited by examiner

*Primary Examiner* — Sujoy Kundu
*Assistant Examiner* — Corey Bailey
(74) *Attorney, Agent, or Firm* — WPAT, PC; Justin King

(57) ABSTRACT

The present invention relates to a method of energy spectrum analysis for sodium iodide (NaI) detector, by which an energy spectrum characteristic obtained from a sodium iodide (NaI) detector is analyzed and used for establishing a system capable of qualitative nuclide identification and activity determination that can be adapted in applications of waste clearance management.

3 Claims, 5 Drawing Sheets

```
┌─────────────────────────────────────────────────────┐
│ measuring the energy spectrums of an identified first radioactive source, │
│ an identified second radioactive source and an identified third          │──20
│ radioactive source so as to obtain a first energy spectrum, a second     │
│ energy spectrum and a third energy spectrum in respective                │
└─────────────────────────────────────────────────────┘
                              │
                              ▼
┌─────────────────────────────────────────────────────┐
│ setting a peak factor $n$ in a manner that $0<n<1$, and locating a first peak, │
│ a second peak and a third peak respectively from the first, the second   │
│ and the third energy spectrums, and thus simultaneously locating the     │
│ channel positions respectively corresponding to each of the three peaks, │
│ and then searching simultaneously to the left and to the right of the    │
│ channel positions of the first peak, the second peak and the third peak so │
│ as to locate respectively two first channel positions whose corresponding │
│ values, i.e. the photon counts, in the first energy spectrum are equal to a │
│ value of the first peak $\times n$, to locate two second channel positions whose │
│ corresponding values, i.e. the photon counts, in the second energy       │──21
│ spectrum are equal to a value of the second peak $\times n$, and also to locate │
│ two third channel positions whose corresponding values, i.e. the photon  │
│ counts, in the third energy spectrum are equal to a value of the third   │
│ peak $\times n$, thereby, defining a range sandwiched between the two first │
│ channel positions of the first energy spectrum to be a first energy area │
│ range, defining a range sandwiched between the two second channel        │
│ positions of the second energy spectrum to be a second energy area       │
│ range, and also defining a range sandwiched between the two third        │
│ channel positions of the third energy spectrum to be a third energy area │
│ range                                                                    │
└─────────────────────────────────────────────────────┘
                              │
                              ▼
┌─────────────────────────────────────────────────────┐
│ calculating six values $a_b$, $a_c$, $b_a$, $b_c$, $c_a$, $c_b$, according to the following │
│ equations: $a_b$ = the area of the first energy spectrum that is defined │
│ within the second energy area range / the area of the first energy       │
│ spectrum that is defined within the first energy area range, $a_c$ = the area │
│ of the first energy spectrum that is defined within the third energy area │
│ range / the area of the first energy spectrum that is defined within the │
│ first energy area range, $b_a$ = the area of the second energy spectrum that │
│ is defined within the first energy area range / the area of the second   │
│ energy spectrum that is defined within the second energy area range, $b_c$ │
│ = the area of the second energy spectrum that is defined within the third │──22
│ energy area range / the area of the second energy spectrum that is       │
│ defined within the second energy area range, $c_a$ = the area of the third │
│ energy spectrum that is defined within the first energy area range / the │
│ area of the third energy spectrum that is defined within the third energy │
│ area range, and $c_b$ = the area of the third energy spectrum that is defined │
│ within the second energy area range / the area of the third energy       │
│ spectrum that is defined within the third energy area range, and thereby, │
│ obtaining the correlations among the first, the second and the third     │
│ energy spectrums                                                         │
└─────────────────────────────────────────────────────┘
                              │
                              ▼
```

FIG. 3A

METHOD OF ENERGY SPECTRUM ANALYSIS FOR SODIUM IODIDE (NAI) DETECTOR

FIELD OF THE INVENTION

The present invention relates to a method of energy spectrum analysis for sodium iodide (NaI) detector, that is adapted for qualitative evaluating the activity of a waste so as to determine whether the activity of the radioactive waste can meet the Regulations on Clearance Level for Radioactive Waste Management for release.

BACKGROUND OF THE INVENTION

For waste clearance management, a conventional waste measurement system can have very high detection efficiency if plastic scintillation detectors are used for measuring the surface activities of wastes, but it will have limited application since such waste measurement systems which use plastic scintillation detectors for activity measurement are incapable of qualitative nuclide identification. On the other hand, although other waste measurement systems that adopt germanium detectors for activity measurement are capable of qualitative nuclide identification, such waste measurement systems can be very pricy and difficult to maintain. Therefore, on the search for better waste measurement system, it is realized that although the systems adopting sodium iodide (NaI) detectors for waste detection might not have satisfactory energy resolution comparing with those systems adopting germanium detectors, the systems using NaI detectors not only can obtain good qualitative nuclide identification, but also can obtain a satisfactory detection efficiency that is even higher than that of the systems adopting germanium detectors. Thus, by performing a specifically designed mathematical calculation upon the energy spectrum obtained from the systems using NaI detectors, the nuclide identification ability of such systems using NaI detectors can be improved to an extend that they are fully capable of being used for waste clearance management. Moreover, in addition to the advantages of low-cost and ease-to-maintain in the NaI detector, it can also operate smoothly without the requirement for using liquid nitrogen in thermostatic control as the germanium detector did. Consequently, it is becoming a good idea for applying NaI detectors in systems of waste clearance management.

Please refer to FIG. 1, which is a schematic diagram showing an energy spectrum of prior art. As shown in FIG. 1, the energy spectrum A relating to a nuclide A is located near to the energy spectrum B relating to a nuclide B, and thus, by adding the two energy spectrums together, a larger energy spectrum can be constructed, i.e. the energy spectrum A+B. Conventionally, the type of a nuclide is identified and determined based upon the horizontal channel position corresponding to the peak of the energy spectrum that is shown in FIG. 1. Therefore, using the conventional nuclide identification method, it is unable to recognize that the joint energy spectrum A+B is actually the combination of the energy spectrum A relating to a nuclide A and the energy spectrum B relating to a nuclide B, and consequently, an erroneous nuclide identification of one erroneous nuclide instead of two correct nuclides is made as it can only identify one peak from the joint energy spectrum A+B.

SUMMARY OF THE INVENTION

In view of the disadvantages of prior art, the primary object of the present invention is to provide a method of energy spectrum analysis for sodium iodide (NaI) detector, by which an energy spectrum characteristic obtained from a sodium iodide (NaI) detector is analyzed and used for establishing a system capable of qualitative nuclide identification and activity determination that can be adapted in applications of waste clearance management.

In an embodiment, the present invention provides a method of energy spectrum analysis for sodium iodide (NaI) detector, which comprises the steps of:

measuring the energy spectrums of an identified first radioactive source and another identified second radioactive source so as to obtain a first energy spectrum and a second energy spectrum;

setting a peak factor n in a manner that $0<n<1$, and locating a first peak and a second peak respectively from the first and the second energy spectrums, and thus simultaneously locating the channel positions respectively corresponding to each of the two peaks, and then searching simultaneously to the left and to the right of the channel positions of the first peak and the second peak so as to locate two first channel positions whose corresponding values, i.e. the photon counts, in the first energy spectrum are equal to a value of the first peak×n, and also to locate two second channel positions whose corresponding values, i.e. the photon counts, in the second energy spectrum are equal to a value of the second peak×n, thereby, defining a range sandwiched between the two first channel positions of the first energy spectrum to be a first energy area range and also defining a range sandwiched between the two second channel positions of the second energy spectrum to be a second energy area range;

calculating two values a, b according to the following equations: a=the area of the first energy spectrum that is defined within the second energy area range/the area of the first energy spectrum that is defined within the first energy area range, b=the area of the second energy spectrum that is defined within the first energy area range/the area of the second energy spectrum that is defined within the second energy area range, and thereby, obtaining the correlations between the first and the second energy spectrums;

for a combined energy spectrum of the first and the second radioactive sources of unknown radioactivities, performing the following calculations for obtaining a first net area and a second net area using the following equations: the first net area=(the first total area−the second total area×b)/(1−a×b); the second net area=(the second total area−the first total area×a)/(1−a×b); wherein, the first total area is the area of the combined energy spectrum of the two radioactive sources of unknown radioactivities that is defined within the first energy area range, and the second total area is the area of the combined energy spectrum of the two radioactive sources of unknown radioactivities that is defined within the second energy area range; and calculating a first radioactivity and a second radioactivity using the following equations: the first radioactivity=the first net area/(a first photon yield×a first detection efficiency×a detection period), and the second radioactivity=the second net area/(a second photon yield×a second detection efficiency×the detection period), wherein, the first and the second photon yields are nuclide-related constants that may not be equal to each other, and the first and the second detection efficiencies are system-related constants that also may not be equal to each other.

In another embodiment, the present invention provides a method of energy spectrum analysis for sodium iodide (NaI) detector, which comprises the steps of:

measuring the energy spectrums of an identified first radioactive source, an identified second radioactive source and an identified third radioactive source so as to obtain a first energy spectrum, a second energy spectrum and a third energy spectrum in respective;

setting a peak factor n in a manner that 0<n<1, and locating a first peak, a second peak and a third peak respectively from the first, the second and the third energy spectrums, and thus simultaneously locating the channel positions respectively corresponding to each of the three peaks, and then searching simultaneously to the left and to the right of the channel positions of the first peak, the second peak and the third peak so as to locate respectively two first channel positions whose corresponding values, i.e. the photon counts, in the first energy spectrum are equal to a value of the first peak×n, to locate two second channel positions whose corresponding values, i.e. the photon counts, in the second energy spectrum are equal to a value of the second peak×n, and also to locate two third channel positions whose corresponding values, i.e. the photon counts, in the third energy spectrum are equal to a value of the third peak×n, thereby, defining a range sandwiched between the two first channel positions of the first energy spectrum to be a first energy area range, defining a range sandwiched between the two second channel positions of the second energy spectrum to be a second energy area range, and also defining a range sandwiched between the two third channel positions of the third energy spectrum to be a third energy area range;

calculating six values $a_b$, $a_c$, $b_a$, $b_c$, $c_a$, $c_b$ according to the following equations: $a_b$=the area of the first energy spectrum that is defined within the second energy area range/the area of the first energy spectrum that is defined within the first energy area range, $a_c$=the area of the first energy spectrum that is defined within the third energy area range/the area of the first energy spectrum that is defined within the first energy area range, $b_a$=the area of the second energy spectrum that is defined within the first energy area range/the area of the second energy spectrum that is defined within the second energy area range, $b_c$=the area of the second energy spectrum that is defined within the third energy area range/the area of the second energy spectrum that is defined within the second energy area range, $c_a$=the area of the third energy spectrum that is defined within the first energy area range/the area of the third energy spectrum that is defined within the third energy area range, and $c_b$=the area of the third energy spectrum that is defined within the second energy area range/the area of the third energy spectrum that is defined within the third energy area range, and thereby, obtaining the correlations among the first, the second and the third energy spectrums;

for a combined energy spectrum of the first, the second and the third radioactive sources of unknown radioactivities, obtaining a first net area, a second net area and a third net area by solving the following simultaneous equations: the first total area=the first net area+the second net area× $b_a$+the third net area×$c_a$; the second total area=the first net area×$a_b$+the second net area+the third net area×$c_b$; and the third total area=the first net area×$a_c$+the second net area×$b_a$+the third net area; wherein, the first total area is the area of the combined energy spectrum of the three radioactive sources of unknown radioactivities that is defined within the first energy area range, the second total area is the area of the combined energy spectrum of the three radioactive sources of unknown radioactivities that is defined within the second energy area range, and the third total area is the area of the combined energy spectrum of the three radioactive sources of unknown radioactivities that is defined within the third energy area range; and calculating a first radioactivity, a second radioactivity and a third radioactivity using the following equations: the first radioactivity=the first net area/(a first photon yield×a first detection efficiency×a detection period), the second radioactivity=the second net area/(a second photon yield×a second detection efficiency×the detection period), and the third radioactivity=the third net area/(a third photon yield×a third detection efficiency× the detection period), wherein, the first, second and third photon yields are nuclide-related constants that may not be equal to each other, and the first, second and third detection efficiencies are system-related constants that may not be equal to each other.

Generally, the measurement for metal wastes is performed focusing upon the detection of four major nuclides, i.e. Cs-137, Mn-54, Co-60, and K-40, since other radioactive nuclides can be very low in percentage and thus can be overlooked. Thus, following the principle described above, an energy spectrum of equal to or even more than four radioactive sources can also be analyzed for obtaining the radioactivity measurements respectively for those radioactive sources.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3, composed FIG. 3A and FIG. 3B, is a flow chart depicting the steps performed in a method of energy spectrum analysis for sodium iodide (NaI) detector according to a second embodiment of the present invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
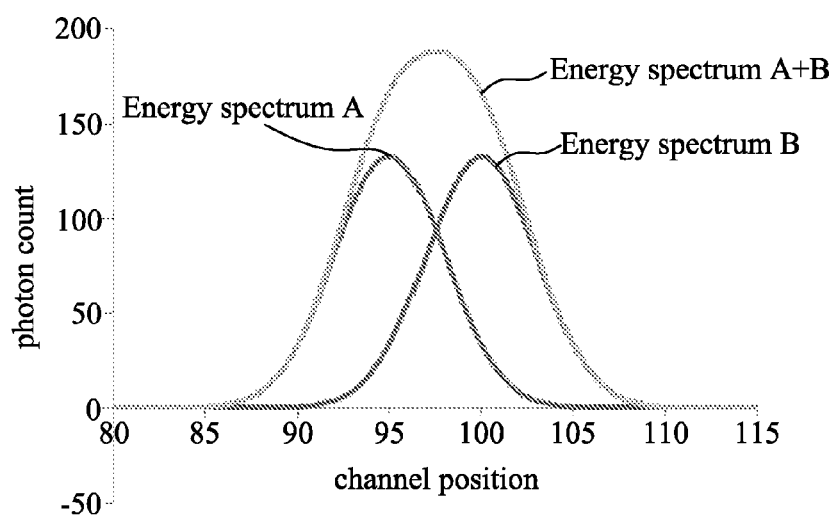
FIG. 1 is a schematic diagram showing an energy spectrum of prior art.
Figure 2A:
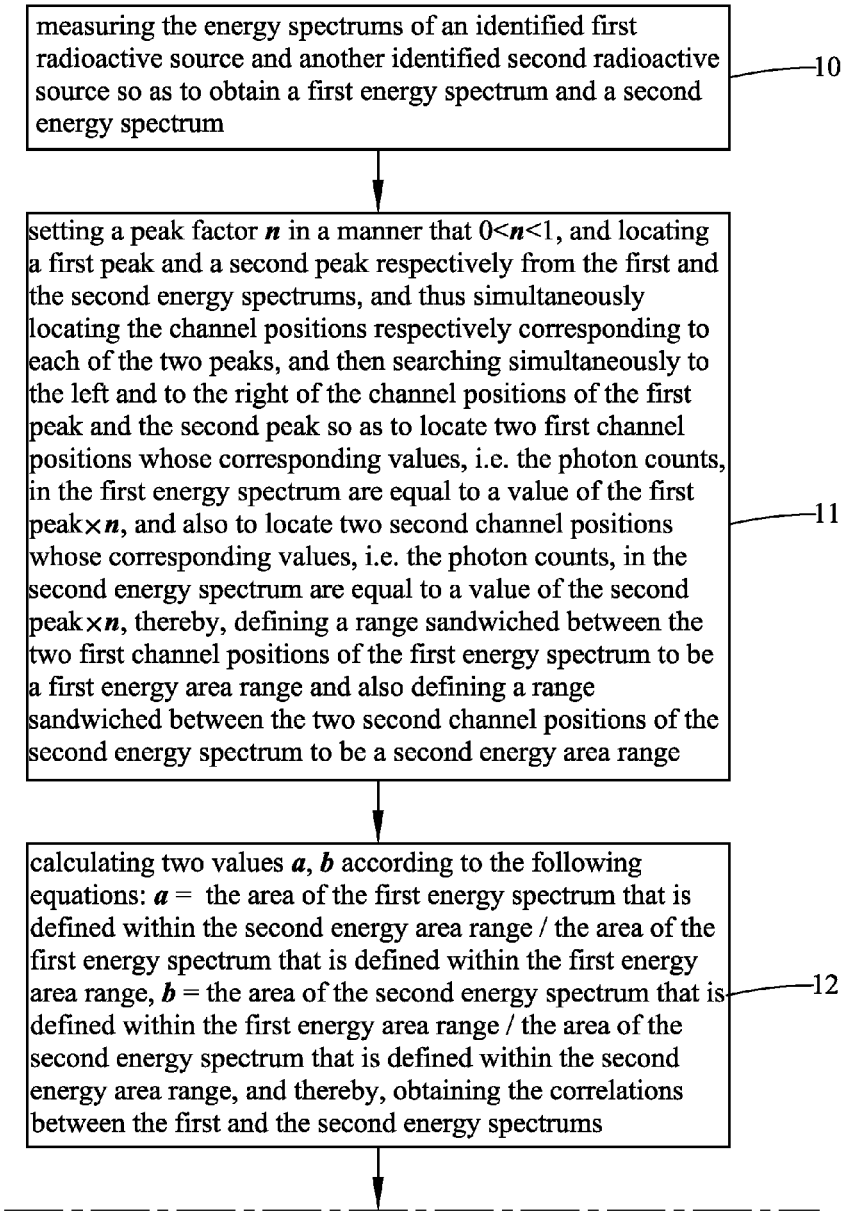
FIG. 2, composed of FIG. 2A and FIG. 2B, is a flow chart depicting the steps performed in a method of energy spectrum analysis for sodium iodide (NaI) detector according to a first embodiment of the present invention.
Figure 2B:
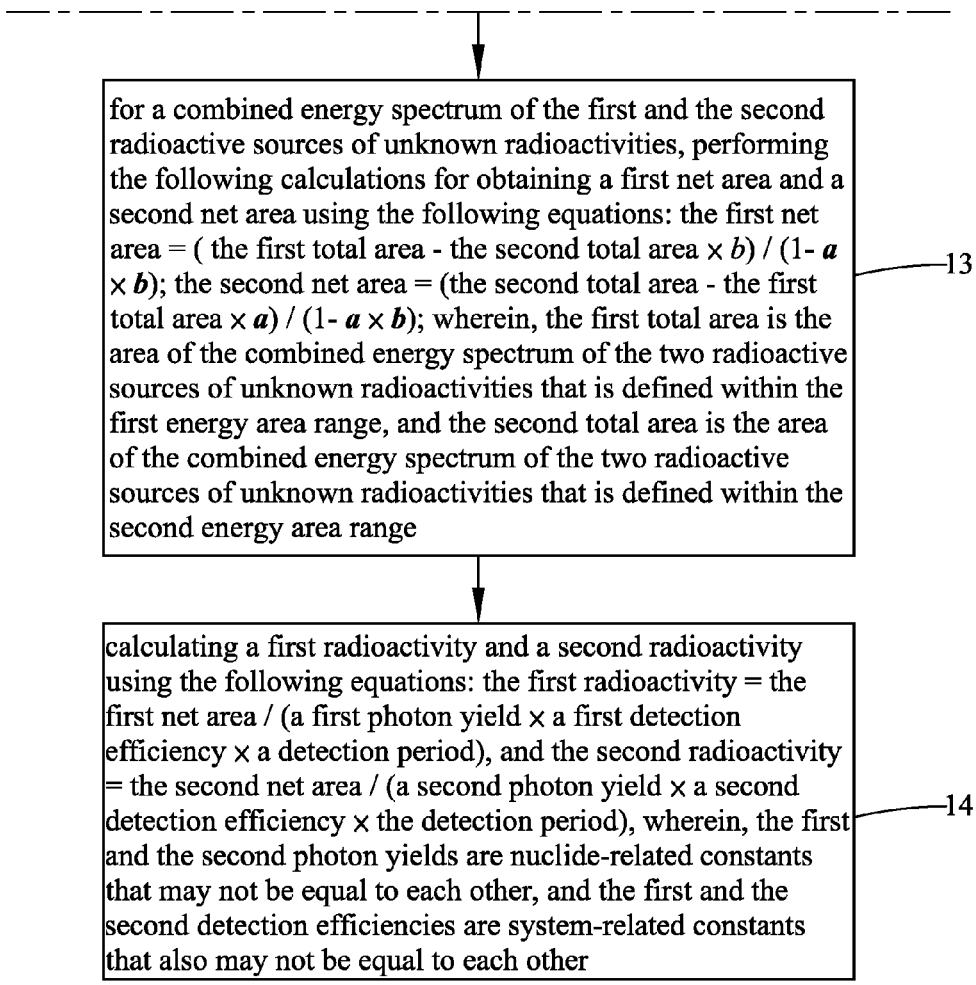

Please refer to FIG. 2, which is a flow chart depicting the steps performed in a method of energy spectrum analysis for sodium iodide (NaI) detector according to a first embodiment of the present invention. The flow starts from the step 10. At step 10, the energy spectrums of an identified first radioactive source and another identified second radioactive source are measured so as to obtain a first energy spectrum and a second energy spectrum; and then the flow proceeds to step 11.

At step 11, a peak factor n is set in a manner that 0<n<1, whereas a typical peak factor being used is 0.5, and then a first peak and a second peak are located respectively from the first and the second energy spectrums, so as to be used for simultaneously locating the channel positions respectively corresponding to each of the two peaks, and then searching simultaneously to the left and to the right of the channel positions of the first peak and the second peak so as to locate two first channel positions whose corresponding values, i.e. the photon counts, in the first energy spectrum are equal to a value of the first peak×n, and also to locate two second channel positions whose corresponding values, i.e. the photon counts, in the second energy spectrum are equal to a value of the second peak×n, thereby, defining a range sandwiched between the two first channel positions of the first energy spectrum to be a first energy area range and also defining a range sandwiched between the two second channel positions of the second energy spectrum to be a second energy area range; and then the flow proceeds to step 12.

At step 12, two values a, b are calculated according to the following equations: a=the area of the first energy spectrum that is defined within the second energy area range/the area of the first energy spectrum that is defined within the first energy area range, b=the area of the second energy spectrum that is defined within the first energy area range/the area of the second energy spectrum that is defined within the second energy area range, and thereby, the correlations between the first and the second energy spectrums can be obtained; and then the flow proceeds to step 13.

At step 13, for a combined energy spectrum of the first and the second radioactive sources of unknown radioactivities, the following calculations are performed for obtaining a first net area and a second net area using the following equations: the first net area=(the first total area−the second total area×b)/(1−a×b); the second net area=(the second total area−the first total area×a)/(1−a×b); wherein, the first total area is the area of the combined energy spectrum of the two radioactive sources of unknown radioactivities that is defined within the first energy area range, and the second total area is the area of the combined energy spectrum of the two radioactive sources of unknown radioactivities that is defined within the second energy area range; and then the flow proceeds to step 14.

At step 14, a first radioactivity and a second radioactivity are calculated using the following equations: the first radioactivity=the first net area/(a first photon yield×a first detection efficiency×a detection period), and the second radioactivity=the second net area/(a second photon yield×a second detection efficiency×the detection period), wherein, the first and the second photon yields are nuclide-related constants that may not be equal to each other, and the first and the second detection efficiencies are system-related constants that may not be equal to each other.

Figure 3B:
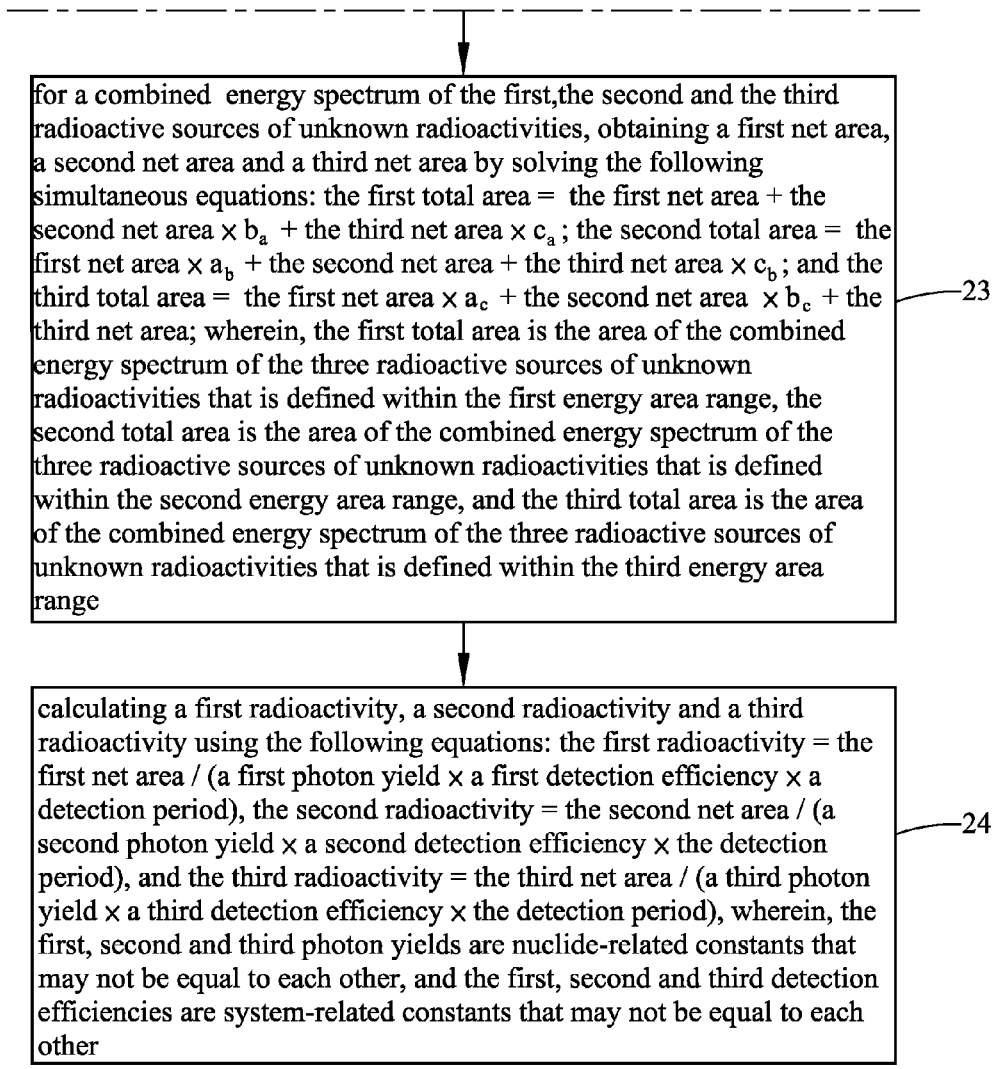

Please refer to FIG. 3, which is a flow chart depicting the steps performed in a method of energy spectrum analysis for sodium iodide (NaI) detector according to a second embodiment of the present invention. The flow starts from the step 20. At step 20, the energy spectrums of an identified first radioactive source, an identified second radioactive source and an identified third radioactive source are measured so as to obtain a first energy spectrum, a second energy spectrum and a third energy spectrum in respective; and then the flow proceeds to step 21.

At step 21, setting a peak factor n in a manner that 0<n<1, whereas a typical peak factor being used is 0.5, and then a first peak, a second peak and a third peak are located respectively from the first, the second and the third energy spectrums, so as to be used for simultaneously locating the channel positions respectively corresponding to each of the three peaks, and then searching simultaneously to the left and to the right of the channel positions of the first peak, the second peak and the third peak so as to locate two first channel positions whose corresponding values, i.e. the photon counts, in the first energy spectrum are equal to a value of the first peak×n, to locate two second channel positions whose corresponding values, i.e. the photon counts, in the second energy spectrum are equal to a value of the second peak×n, and also to locate two third channel positions whose corresponding values, i.e. the photon counts, in the third energy spectrum are equal to a value of the third peak×n, thereby, defining a range sandwiched between the two first channel positions of the first energy spectrum to be a first energy area range, defining a range sandwiched between the two second channel positions of the second energy spectrum to be a second energy area range, and also defining a range sandwiched between the two third channel positions of the third energy spectrum to be a third energy area range; and then the flow proceeds to step 22.

At step 22, six values $a_b$, $a_c$, $b_a$, $b_c$, $c_a$, $c_b$ are calculated according to the following equations: $a_b$=the area of the first energy spectrum that is defined within the second energy area range/the area of the first energy spectrum that is defined within the first energy area range, $a_c$=the area of the first energy spectrum that is defined within the third energy area range/the area of the first energy spectrum that is defined within the first energy area range, $b_a$=the area of the second energy spectrum that is defined within the first energy area range/the area of the second energy spectrum that is defined within the second energy area range, $b_c$=the area of the second energy spectrum that is defined within the third energy area range/the area of the second energy spectrum that is defined within the second energy area range, $c_a$=the area of the third energy spectrum that is defined within the first energy area range/the area of the third energy spectrum that is defined within the third energy area range, and $c_b$=the area of the third energy spectrum that is defined within the second energy area range/the area of the third energy spectrum that is defined within the third energy area range, and thereby, obtaining the correlations among the first, the second and the third energy spectrums; and then the flow proceeds to step 23.

At step 23, for a combined energy spectrum of the first, the second and the third radioactive sources of unknown radioactivities, a first net area, a second net area and a third net area are obtained by solving the following simultaneous equations: the first total area=the first net area+the second net area×$b_a$+the third net area×$c_a$; the second total area=the first net area×$a_b$+the second net area+the third net area×$c_b$; and the third total area=the first net area×$a_c$+the second net area×$b_a$+ the third net area; wherein, the first total area is the area of the combined energy spectrum of the three radioactive sources of unknown radioactivities that is defined within the first energy area range, the second total area is the area of the combined energy spectrum of the three radioactive sources of unknown radioactivities that is defined within the second energy area range, and the third total area is the area of the combined energy spectrum of the three radioactive sources of unknown radioactivities that is defined within the third energy area range; and then the flow proceeds to step 24.

At step 24, a first radioactivity, a second radioactivity and a third radioactivity are calculated using the following equations: the first radioactivity=the first net area/(a first photon yield×a first detection efficiency×a detection period), the second radioactivity=the second net area/(a second photon yield×a second detection efficiency×the detection period), and the third radioactivity=the third net area/(a third photon yield×a third detection efficiency×the detection period), wherein, the first, second and third photon yields are nuclide-related constants that may not be equal to each other, and the first, second and third detection efficiencies are system-related constants that also may not be equal to each other.

It is noted that following the principle described above, an energy spectrum of equal to or even more than four radioactive sources can also be analyzed for obtaining the radioactivity measurements respectively for those radioactive sources.

Generally, there can be a variety of nuclides that are contained in the wastes to be measured. However, it is noted that one can expect to have a specific type of nuclide to be contained in a specific type of waste. For instance, the measurement for metal wastes is performed focusing upon the detection of four major nuclides, i.e. Cs-137, Mn-54, Co-60, and K-40, since other radioactive nuclides can be very low in percentage and thus can be overlooked, which is also the same to the concrete wastes but with different types of radioactive nuclides. Thus, following the principle described above, an energy spectrum of equal to or even more than four radioactive sources can also be analyzed for obtaining the radioactivity measurements respectively for those radioactive sources. For doing so, a measurement is first being performed for determining the types of radioactive nuclides that are expected to be contained in the waste sample according to the source of the waste sample and the attributes thereof as well, and then a system calibration is performed in view of those determined nuclides while acquiring the spectrum characteristics relating to those determined nuclides during the calibration. Thereafter, a numerical model/calculation can be used for obtaining respectively the measurements of radioactivities for those determined nuclides that are contained in the waste sample.

Accordingly, in another embodiment, the present invention further provides a method of energy spectrum analysis for sodium iodide (NaI) detector, which comprises the steps of:

performing a measurement for determining the K types of radioactive nuclides that are identified to be contained in a waste sample according to the source of the waste sample and the attributes thereof as well, i.e. the nuclide 1, the nuclide 2, ..., and the nuclide K, and measuring the radioactive sources respectively based upon the nuclide 1, the nuclide 2, ..., and the nuclide K, so as to acquire a first energy spectrum, a second energy spectrum, ..., and a $K^{th}$ energy spectrum in respective;

setting a peak factor n in a manner that $0<n<1$, and locating a first peak, a second peak, ..., and a $K^{th}$ peak respectively from the first energy spectrum, the second energy spectrum, ..., and the $K^{th}$ energy spectrum, and thus simultaneously locating the channel positions respectively corresponding to each of the K peaks, and then searching simultaneously to the left and to the right of the channel positions of the first peak, the second peak, ..., and the $K^{th}$ peak so as to locate two channel positions in each of those K energy spectrums whose corresponding values, i.e. the photon counts, respectively in their corresponding energy spectrums are equal to a value of their corresponding peaks×n, thereby, defining respectively a range sandwiched between the two channel positions of each of the K energy spectrums to be an energy area range (ROI), i.e. a first energy area range for the first energy spectrum (ROI_1), a second energy area range for the second energy spectrum (ROI_2), ..., and a $K^{th}$ energy area range for the $K^{th}$ energy spectrum (ROI_K);

calculating coefficients $C_{a,b}$ according to the following equations: $C_{a,b}$=the area of the $a^{th}$ energy spectrum that is defined within the $b^{th}$ energy area range (ROI_b)/the area of the $a^{th}$ energy spectrum that is defined within the $a^{th}$ energy area range (ROL_a), whereas $1 \leq a \leq K$ and $1 \leq b \leq K$;

for a combined energy spectrum of the K radioactive nuclides, performing the following calculations for obtaining a first net area (NetArea1), a second net area (NetArea2), ..., and a $K^{th}$ net area (NetAreaK) using the following simultaneous equations:

$$TotalArea1 = C_{1,1} \times NetArea1 + C_{1,2} \times NetArea2 + \ldots + C_{1,K} \times NetAreaK;$$

$$TotalArea2 = C_{2,1} \times NetArea1 + C_{2,2} \times NetArea2 + \ldots + C_{2,K} \times NetAreaK;$$

$$\ldots$$

$$\ldots$$

$$TotalAreaK = C_{K,1} \times NetArea1 + C_{K,2} \times NetArea2 + \ldots + C_{K,K} \times NetAreaK;$$

wherein, the first total area (TotalArea1) is the area of the combined energy spectrum of the waste sample that is defined within the first energy area range (ROI_1), and the second total area (TotalArea2) is the area of the combined energy spectrum of the waste sample that is defined within the second energy area range (ROI_2), ..., and the $K^{th}$ total area (TotalAreaK) is the area of the combined energy spectrum of the waste sample that is defined within the $K^{th}$ energy area range (ROI_K), and consequently, since $C_{a,b}$ are coefficients that are already obtained from the previous steps, the K unknown values of the simultaneously equations, i.e. NetArea1, NetArea2, ..., NetAreaK, can be obtained as following:

$$NetArea1 = \frac{\begin{vmatrix} TotalArea1 & C_{1,2} & \cdots & C_{1,K} \\ TotalArea2 & C_{2,2} & \cdots & C_{2,K} \\ \vdots & \vdots & \ddots & \vdots \\ TotalAreaK & C_{K,2} & \cdots & C_{K,K} \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}};$$

$$NetArea2 = \frac{\begin{vmatrix} C_{1,1} & TotalArea1 & \cdots & C_{1,K} \\ C_{2,1} & TotalArea2 & \cdots & C_{2,K} \\ \vdots & \vdots & \ddots & \vdots \\ C_{K,1} & TotalAreaK & \cdots & C_{K,K} \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}};$$

...

$$NetAreaK = \frac{\begin{vmatrix} C_{1,1} & C_{1,2} & \cdots & TotalArea1 \\ C_{2,1} & C_{2,2} & \cdots & TotalArea2 \\ \vdots & \vdots & \ddots & \vdots \\ C_{K,1} & C_{K,2} & \cdots & TotalAreaK \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}}; \text{ and}$$

calculating a first radioactivity, a second radioactivity, ..., and a $K^{th}$ radioactivity using the following equations: the first radioactivity=NetArea1/(a first photon yield×a first detection efficiency×a detection period), and the second radioactivity=NetArea2/(a second photon yield×a second detection efficiency×the detection period), ..., and the $K^{th}$ radioactivity=NetAreaK1/(a $K^{th}$ photon yield×a $K^{th}$ detection efficiency×the detection period), wherein, the first, the second, ..., and the $K^{th}$ photon yields are nuclide-related constants that may not be equal to each other, and the first, the second, ..., and the $K^{th}$ detection efficiencies are system-related constants that also may not be equal to each other.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A non-transitory computer-readable storage medium with an executable program stored thereon, wherein said program instructs a microprocessor to perform an energy spectrum analysis for sodium iodide (NaI) detector, which comprises the steps of:

measuring the energy spectrums of an identified first radioactive source and another identified second radioactive source so as to obtain a first energy spectrum and a second energy spectrum;

setting a peak factor n in a manner that 0<n<1, and locating a first peak and a second peak respectively from the first and the second energy spectrums, and thus simultaneously locating the channel positions respectively corresponding to each of the two peaks, and then searching simultaneously to the left and to the right of the channel positions of the first peak and the second peak so as to locate two first channel positions whose corresponding values, i.e. the photon counts, in the first energy spectrum are equal to a value of the first peak×n, and also to locate two second channel positions whose corresponding values, i.e. the photon counts, in the second energy spectrum are equal to a value of the second peak×n, thereby, defining a range sandwiched between the two first channel positions of the first energy spectrum to be a first energy area range and also defining a range sandwiched between the two second channel positions of the second energy spectrum to be a second energy area range;

calculating two values a, b according to the following equations: a=the area of the first energy spectrum that is defined within the second energy area range/the area of the first energy spectrum that is defined within the first energy area range, b=the area of the second energy spectrum that is defined within the first energy area range/the area of the second energy spectrum that is defined within the second energy area range, and thereby, obtaining the correlations between the first and the second energy spectrums;

for a combined energy spectrum of the first and the second radioactive sources of unknown radioactivities, performing the following calculations for obtaining a first net area and a second net area using the following equations: the first net area=(the first total area−the second total area×b)/(1−a×b); the second net area=(the second total area−the first total area×a)/(1−a×b); wherein, the first total area is the area of the combined energy spectrum of the two radioactive sources of unknown radioactivities that is defined within the first energy area range, and the second total area is the area of the combined energy spectrum of the two radioactive sources of unknown radioactivities that is defined within the second energy area range; and calculating a first radioactivity and a second radioactivity using the following equations: the first radioactivity=the first net area/(a first photon yield×a first detection efficiency×a detection period), and the second radioactivity=the second net area/(a second photon yield×a second detection efficiency×the detection period), wherein, the first and the photon yields are nuclide-related constants that may not be equal to each other, and the first and the second detection efficiencies are system-related constants that also may not be equal to each other.

2. A non-transitory computer-readable storage medium with an executable program stored thereon, wherein said program instructs a microprocessor to perform an energy spectrum analysis for sodium iodide (NaI) detector, which comprises the steps of:

measuring the energy spectrums of an identified first radioactive source, an identified second radioactive source and an identified third radioactive source so as to obtain a first energy spectrum, a second energy spectrum and a third energy spectrum in respective;

setting a peak factor n in a manner that 0<n<1, and locating a first peak, a second peak and a third peak respectively from the first, the second and the third energy spectrums, and thus simultaneously locating the channel positions respectively corresponding to each of the three peaks, and then searching simultaneously to the left and to the right of the channel positions of the first peak, the second peak and the third peak so as to locate respectively two first channel positions whose corresponding values, i.e. the photon counts, in the first energy spectrum are equal to a value of the first peak×n, to locate two second channel positions whose corresponding values, i.e. the photon counts, in the second energy spectrum are equal to a value of the second peak×n, and also to locate two third channel positions whose corresponding values, i.e. the photon counts, in the third energy spectrum are equal to a value of the third peak×n, thereby, defining a range sandwiched between the two first channel positions of the first energy spectrum to be a first energy area range, defining a range sandwiched between the two second channel positions of the second energy spectrum to be a second energy area range, and also defining a range sandwiched between the two third channel positions of the third energy spectrum to be a third energy area range;

calculating six values $a_b$, $a_c$, $b_a$, $b_c$, $c_a$, $c_b$ according to the following equations: $a_b$=the area of the first energy spectrum that is defined within the second energy area range/ the area of the first energy spectrum that is defined within the first energy area range, $a_c$=the area of the first energy spectrum that is defined within the third energy area range/the area of the first energy spectrum that is defined within the first energy area range, $b_a$=the area of the second energy spectrum that is defined within the first energy area range/the area of the second energy spectrum that is defined within the second energy area range, $b_c$=the area of the second energy spectrum that is defined within the third energy area range/the area of the second energy spectrum that is defined within the second energy area range, $c_a$=the area of the third energy spectrum that is defined within the first energy area range/the area of the third energy spectrum that is defined within the third energy area range, and $c_b$=the area of the third energy spectrum that is defined within the second energy area range/the area of the third energy spectrum that is defined within the third energy area range, and thereby, obtaining the correlations among the first, the second and the third energy spectrums;

for a combined energy spectrum of the first, the second and the third radioactive sources of unknown radioactivities, obtaining a first net area, a second net area and a third net area by solving the following simultaneous equations: the first total area=the first net area+the second net area× $b_a$+the third net area×$c_a$; the second total area=the first net area×$a_b$+the second net area+the third net area×$c_b$; and the third total area=the first net area×$a_c$+the second net area×$b_c$+the third net area; wherein, the first total area is the area of the combined energy spectrum of the three radioactive sources of unknown radioactivities that is defined within the first energy area range, the second total area is the area of the combined energy spectrum of the three radioactive sources of unknown radioactivities that is defined within the second energy area range, and the third total area is the area of the combined energy spectrum of the three radioactive sources of unknown radioactivities that is defined within the third energy area range; and calculating a first radioactivity, a second radioactivity and a third radioactivity using the following equations: the first radioactivity=the first net area/(a first photon yield×a first detection efficiency×a detection period), the second radioactivity=the second net area/(a second photon yield×a second detection efficiency×the detection period), and the third radioactivity=the third net area/(a third photon yield×a third detection efficiency× the detection period), wherein, the first, second and third photon yields are nuclide-related constants that may not be equal to each other, and the first, second and third detection efficiencies are system-related constants that may not be equal to each other.

3. A non-transitory computer-readable storage medium with an executable program stored thereon, wherein said program instructs a microprocessor to perform an energy spectrum analysis for sodium iodide (NaI) detector, which comprises the steps of:

performing a measurement for determining the K types of radioactive nuclides that are identified to be contained in a waste sample according to the source of the waste sample and the attributes thereof as well, i.e. the nuclide 1, the nuclide 2, . . . , and the nuclide K, and measuring the radioactive sources respectively based upon the nuclide 1, the nuclide 2, . . . , and the nuclide K, so as to acquire a first energy spectrum, a second energy spectrum, . . . , and a $K^{th}$ energy spectrum in respective;

setting a peak factor n in a manner that 0<n<1, and locating a first peak, a second peak, . . . , and a $K^{th}$ peak respectively from the first energy spectrum, the second energy spectrum, . . . , and the $K^{th}$ energy spectrum, and thus simultaneously locating the channel positions respectively corresponding to each of the K peaks, and then searching simultaneously to the left and to the right of the channel positions of the first peak, the second peak, . . . , and the $K^{th}$ peak so as to locate two channel positions in each of those K energy spectrums whose corresponding values, i.e. the photon counts, respectively in their corresponding energy spectrums are equal to a value of their corresponding peaks×n, thereby, defining respectively a range sandwiched between the two channel positions of each of the K energy spectrums to be an energy area range (ROI), i.e. a first energy area range for the first energy spectrum (ROI_1), a second energy area range for the second energy spectrum (ROI_2), . . . , and a $K^{th}$ energy area range for the $K^{th}$ energy spectrum (ROI_K);

calculating coefficients $C_{a,b}$ according to the following equations: $C_{a,b}$=the area of the $a^{th}$ energy spectrum that is defined within the $b^{th}$ energy area range (ROI_b)/the area of the $a^{th}$ energy spectrum that is defined within the $a^{th}$ energy area range (ROI_a), whereas $1 \le a \le K$ and $1 \le b \le K$;

for a combined energy spectrum of the K radioactive nuclides, performing the following calculations for obtaining a first net area (NetArea1), a second net area (NetArea2), . . . , and a $K^{th}$ net area (NetAreaK) using the following simultaneous equations:

$$TotalArea1 = C_{1,1} \times NetArea1 + C_{1,2} \times NetArea2 + \ldots + C_{1,K} \times NetAreaK;$$

$$TotalArea2 = C_{2,1} \times NetArea1 + C_{2,2} \times NetArea2 + \ldots + C_{2,K} \times NetAreaK;$$

$$\ldots$$

$$\ldots$$

$$TotalAreaK = C_{K,1} \times NetArea1 + C_{K,2} \times NetArea2 + \ldots + C_{K,K} \times NetAreaK;$$

wherein, the first total area (TotalArea1) is the area of the combined energy spectrum of the waste sample that is defined within the first energy area range (ROI_1), and the second total area (TotalArea2) is the area of the combined energy spectrum of the waste sample that is defined within the second energy area range (ROI_2), ..., and the $K^{th}$ total area (TotalAreaK) is the area of the combined energy spectrum of the waste sample that is defined within the $K^{th}$ energy area range (ROI_K), and consequently, since $C_{a,b}$ are coefficients that are already obtained from the previous steps, the K unknown values of the simultaneously equations, i.e. NetArea1, NetArea2, ..., NetAreaK, can be obtained as following:

$$NetArea1 = \frac{\begin{vmatrix} TotalArea1 & C_{1,2} & \cdots & C_{1,K} \\ TotalArea2 & C_{2,2} & \cdots & C_{2,K} \\ \vdots & \vdots & \ddots & \vdots \\ TotalAreaK & C_{K,2} & \cdots & C_{K,K} \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}};$$

$$NetArea2 = \frac{\begin{vmatrix} C_{1,1} & TotalArea1 & \cdots & C_{1,K} \\ C_{2,1} & TotalArea2 & \cdots & C_{2,K} \\ \vdots & \vdots & \ddots & \vdots \\ C_{K,1} & TotalAreaK & \cdots & C_{K,K} \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}};$$

...

$$NetAreaK = \frac{\begin{vmatrix} C_{1,1} & C_{1,2} & \cdots & TotalArea1 \\ C_{2,1} & C_{2,2} & \cdots & TotalArea2 \\ \vdots & \vdots & \ddots & \vdots \\ C_{K,1} & C_{K,2} & \cdots & TotalAreaK \end{vmatrix}}{\begin{vmatrix} C_{1,1} & C_{1,2} & \cdots & C_{1,K} \\ C_{2,1} & C_{2,2} & \cdots & C_{2,K} \\ \vdots & \vdots & \ddots & \vdots \\ C_{K,1} & C_{K,2} & \cdots & C_{K,K} \end{vmatrix}}; \text{ and}$$

calculating a first radioactivity, a second radioactivity, ..., and a $K^{th}$ radioactivity using the following equations: the first radioactivity=NetArea1/(a first photon yield×a first detection efficiency×a detection period), and the second radioactivity=NetArea2/(a second photon yield×a second detection efficiency×the detection period), ..., and the $K^{th}$ radioactivity=NetAreaK/(a $K^{th}$ photon yield×a $K^{th}$ detection efficiency×the detection period), wherein, the first, the second, ..., and the $K^{th}$ photon yields are nuclide-related constants that may not be equal to each other, and the first, the second, ..., and the $K^{th}$ detection efficiencies are system-related constants that also may not be equal to each other.

\* \* \* \* \*